(12) United States Patent
Okaji et al.

(10) Patent No.: US 8,517,389 B2
(45) Date of Patent: Aug. 27, 2013

(54) FIXING ARRANGEMENT FOR A RUBBER SEAL FOR SEALING A ROLLING BEARING

(75) Inventors: Yoshitaka Okaji, Kawachinagano (JP); Eiichi Urakami, Osaka (JP)

(73) Assignees: NTN Corporation, Osaka (JP); Nakanishi Metal Works, Co., Ltd., Osaka (JP)

(*) Notice: Subject to any disclaimer, the term of this patent is extended or adjusted under 35 U.S.C. 154(b) by 415 days.

(21) Appl. No.: 12/865,159

(22) PCT Filed: Feb. 3, 2009

(86) PCT No.: PCT/JP2009/051782
§ 371 (c)(1),
(2), (4) Date: Jul. 29, 2010

(87) PCT Pub. No.: WO2009/099059
PCT Pub. Date: Aug. 13, 2009

(65) Prior Publication Data
US 2010/0327539 A1 Dec. 30, 2010

(30) Foreign Application Priority Data
Feb. 5, 2008 (JP) .................... 2008-024979

(51) Int. Cl.
*F16J 15/32* (2006.01)
(52) U.S. Cl.
USPC ................ 277/551; 277/573; 277/574
(58) Field of Classification Search
USPC .................... 277/549, 551, 573–574
See application file for complete search history.

(56) References Cited

U.S. PATENT DOCUMENTS

| 2,830,858 | A | * | 4/1958 | Moorman et al. | 384/484 |
| 3,601,411 | A | * | 8/1971 | Bourgeois | 277/349 |
| 3,709,572 | A | * | 1/1973 | Pethis | 277/376 |
| 4,726,243 | A | * | 2/1988 | Rohde | 476/6 |
| 4,726,696 | A | * | 2/1988 | Dickinson et al. | 384/477 |
| 4,792,243 | A | * | 12/1988 | Takeuchi et al. | 384/486 |
| 4,874,261 | A | * | 10/1989 | Colanzi et al. | 277/574 |
| 6,719,459 | B1 | * | 4/2004 | Gotoh | 384/482 |
| 6,854,893 | B2 | * | 2/2005 | Schmidt | 384/486 |
| 7,201,685 | B2 | * | 4/2007 | Terada et al. | 474/70 |
| 7,591,593 | B2 | * | 9/2009 | Tsujimoto | 384/486 |

FOREIGN PATENT DOCUMENTS

| JP | 59-1931 | 1/1984 |
| JP | 2-140028 | 11/1990 |
| JP | 5-96550 | 12/1993 |
| JP | 2004-162874 | 6/2004 |
| JP | 2008-008448 | 1/2008 |

* cited by examiner

*Primary Examiner* — Vishal Patel
(74) *Attorney, Agent, or Firm* — Wenderoth, Lind & Ponack, L.L.P.

(57) ABSTRACT

A fixing arrangement for a rubber seal for sealing a rolling bearing is proposed which can be easily mounted in position by press-fitting and which prevents rotation of the rubber seal together with the rotary member of the bearing. A thick-walled fitting portion 3 and a protrusion 4 are formed on the radially outer portion of a rubber seal 1 reinforced by a metal core 2. The fitting portion 3 is press-fitted in a seal groove 22 formed in the radially inner surface of an outer race 21 at each end. The protrusion 4 is brought into elastic contact with a large-diameter cylindrical surface 23 formed on the outer race 21. Thus, the rubber seal 1 is fixed in position and prevented from rotating together with the inner race of the bearing.

11 Claims, 3 Drawing Sheets

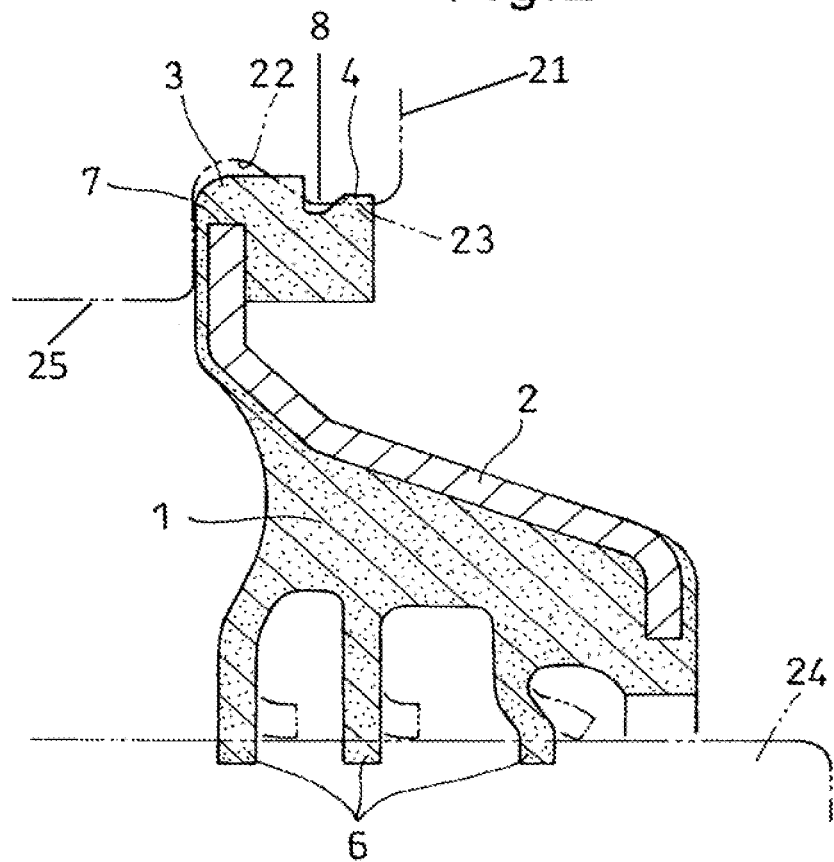
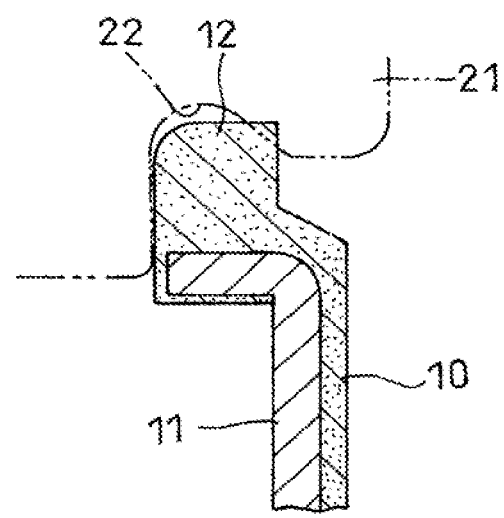

FIXING ARRANGEMENT FOR A RUBBER SEAL FOR SEALING A ROLLING BEARING

TECHNICAL FIELD

This invention relates to a fixing arrangement for a rubber seal for sealing the opening at each end of an annular space defined between the outer race and the inner race of a rolling bearing.

BACKGROUND OF THE INVENTION

In order to prevent leakage of lubricating grease in a rolling bearing and to prevent entry of foreign matter into the bearing, a rubber seal is used to seal the opening at each end of an annular space defined between the outer race and the inner race of the bearing.

When mounting the rubber seal, a fixing arrangement shown in FIG. 3 is ordinarily used. This fixing arrangement includes a thick-walled portion 12 formed at the radially outer portion of a rubber seal 10 reinforced with a metal core 11 and pressed-fitted in a seal groove 22 formed in the radially inner surface of the outer race 21 so that the thick-walled portion 12 does not separate from the seal groove.

But since the fixing arrangement for the rubber seal 10 shown in FIG. 3 is structured to prevent rotation of the rubber seal 10 by the elastic contact between the inner periphery of the seal groove 22 and the thick-walled portion 12, it is difficult to stably fix the rubber seal in position. If the starting/turning torque is large, the rubber seal 10 may rotate together with the rotary member. Thus this fixing arrangement cannot be used for a bearing with lip seals which encounters large rotational resistance.

Thus, with a bearing with seal lips which encounters large rotational resistance, as shown in FIG. 4, a cylindrical bent piece 13 is provided at the radially outer portion of the reinforcing metal core 11 and the radially outer portion of the metal core 11 is pressed into the seal groove 22 by caulking the bent piece 13, thereby fixing the rubber seal 10 in position. But these fixing steps are difficult and extremely troublesome.

SUMMARY OF THE INVENTION

An object of the present invention is to provide a fixing arrangement for a rubber seal for sealing a rolling bearing which can be easily mounted in position by press-fitting and which prevents rotation of the rubber seal together with the rotary member of the bearing.

In order to achieve this object, the present invention provides a fixing arrangement for a rubber seal for sealing a rolling bearing, the fixing arrangement comprising a thick-walled fitting portion provided at a radially outer portion of the rubber seal, which is reinforced by a metal core, wherein the rubber seal is mounted to an outer race of the rolling bearing by press-fitting the fitting portion in one of seal grooves formed in a radially inner surface of the outer race at both ends thereof, wherein the fixing arrangement further comprises a contact portion formed on the rubber seal axially outwardly of the fitting portion of the rubber seal, and kept in elastic contact with a large-diameter cylindrical surface formed on the outer race axially outwardly of the seal groove of the outer race.

The contact portion may comprise an annular protrusion provided axially spaced from the fitting portion, or may comprise a plurality of protrusions circumferentially spaced apart from each other.

If the annular protrusion is formed, the side of the protrusion facing the fitting portion may be a tapered surface tapered such that the wall thickness of the protrusion deceases radially outwardly so that the protrusion can be easily press-fitted in the large-diameter cylindrical surface, thereby making it even easier to mount the rubber seal in position.

In this fixing arrangement, the metal core may have a cylindrical portion at its radially outer portion. Such a cylindrical portion reduces radial elastic deformation of the fitting portion, so that the fitting portion can be pressed hard against the inner periphery of the seal groove, which in turn makes it possible to reliably rotationally fix the rubber seal to the outer race.

The metal core may have a sheared edge on its outer periphery formed by press stamping. In this case, the difference in radius between the outer diameter of the metal core and the inner diameter of the large-diameter cylindrical surface is preferably set to be 0.1 mm or over and 2 mm or less. With this arrangement, the radially outer surface of the metal core reduces radial elastic deformation of the fitting portion. Thus, in this case too, it is possible to press the fitting portion hard against the inner periphery of the seal groove. Further, the metal core is less likely to impair radially inward elastic deformation of the protrusion, so that the protrusion can be easily press-fitted into the large-diameter cylindrical surface.

By setting the difference in radius between the radially outer surface of the metal core and the large-diameter cylindrical surface to be 0.1 mm or over, it is possible to prevent the sheared edge on the radially outer surface of the metal core from interfering with the radially inner portion of the large-diameter cylindrical surface formed on the bearing outer race axially outwardly of the seal groove. This makes it easier to fit the fitting portion of the rubber seal in the seal groove.

The rubber seal may include a plurality of lips on its inner periphery to improve sealability of the bearing.

According to the present invention, since the contact portion is provided on the rubber seal at its portion axially outwardly of its fitting portion so as to be kept in elastic contact with the large-diameter cylindrical surface formed on the outer race at its portion axially outwardly of its seal groove, it is possible to reliably prevent rotation of the rubber seal by the friction between the contact portions of the inner periphery of the seal groove and the fitting portion and by the friction between the large-diameter cylindrical surface and the contact portion. Thus, this bearing seal can be used for a bearing with seal lips that encounters large rotational resistance.

Since this rubber seal can be mounted by press-fitting, it can be easily mounted on a rolling bearing.

BRIEF DESCRIPTION OF THE DRAWINGS

FIG. 2 is a sectional view of a modified rubber seal.

FIG. 3 is a sectional view of a conventional fixing arrangement for a rubber seal for sealing a rolling bearing.

DETAILED DESCRIPTION OF THE INVENTION

Figure 1:
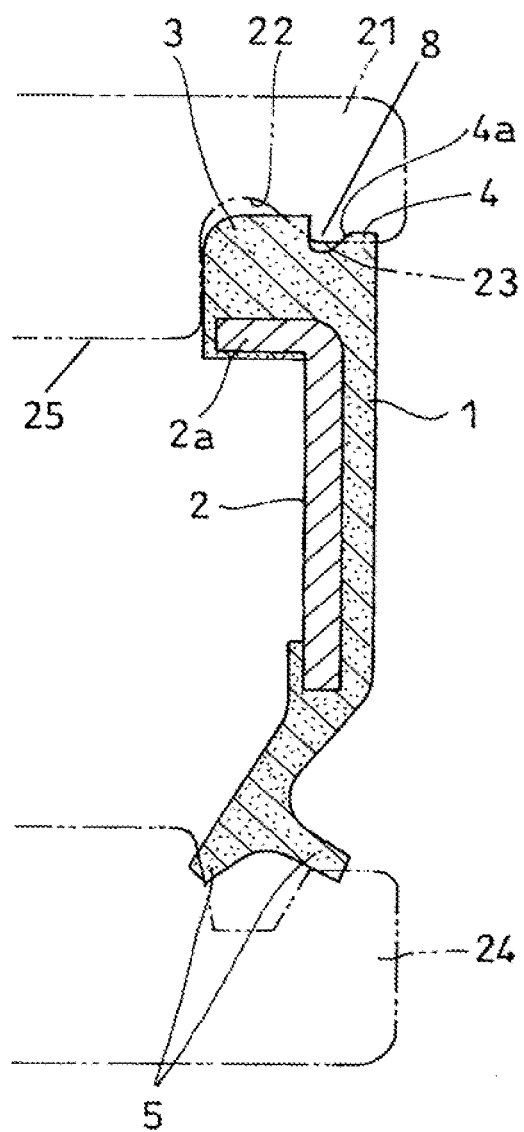
FIG. 1 is a sectional view of a fixing arrangement for a rubber seal for sealing a rolling bearing embodying the present invention.

Now the embodiment of the present invention is described with reference to FIGS. 1 and 2. As shown in FIG. 1, a rubber seal 1 is reinforced by a metal core 2. The rubber seal 1 has a thick-walled fitting portion 3 at its radially outer portion, and an annular protrusion 4 provided axially outwardly of the fitting portion 3 as a contact portion.

The fitting portion 3 is press-fitted in a seal groove 22 formed in the radially inner surface of an outer race 21 at its end. The protrusion 4 is in elastic contact with a large-diameter cylindrical surface 23 formed on the outer race 21 axially outwardly of the seal groove 22. As illustrated in the figures, the outer race 21 has a small diameter cylindrical surface 25 disposed axially inwardly of the seal groove 22. The side of the protrusion facing the fitting portion 3 is a tapered surface 4a that is tapered such that the wall thickness of the protrusion 4 decreases radially outwardly.

A plurality of seal lips 5 are formed at the radially inner portion of the rubber seal 1 which are in elastic contact with an inner race 24.

The metal core 2 has a cylindrical portion 2a at its radially outer portion. As illustrated, the radially outer portion of the metal core 2 preferably extends radially outwardly beyond the small diameter cylindrical surface 25 of the outer race 21. The cylindrical portion 2a reduces radially inward elastic deformation of the fitting portion 3, and also optimizes the contact pressure of the fitting portion 3 against the inner periphery of the seal groove 22.

The protrusion 4 of the rubber seal 1, which is provided axially outwardly of the fitting portion 3 such that a radially inwardly recessed groove 8 is formed axially between the fitting portion 3 and the protrusion 4, is in elastic contact with the large-diameter cylindrical surface 23 formed on the outer race 21 axially outwardly of the seal groove 22, thereby reliably preventing rotation of the rubber seal 1 by the friction between the large-diameter cylindrical surface 23 and the protrusion 4, in addition to the friction between the inner periphery surface of the seal groove 22 and the fitting portion 3.

Figure 4:
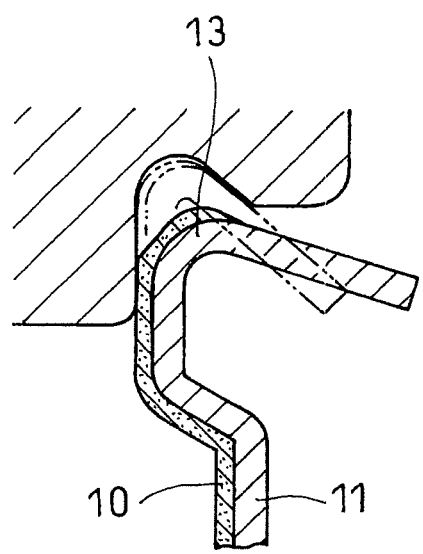
FIG. 4 is a sectional view of another conventional fixing arrangement for a rubber seal for sealing a rolling bearing.

This eliminates the necessity for the fixing arrangement shown in FIG. 4 even if the bearing encounters large rotational resistance.

Since the rubber seal 1 is press-fitted into the seal groove 22, it can be easily mounted to the rolling bearing. With the arrangement in which the side of the protrusion 4 facing the fitting portion 3 is the tapered surface 4a, when the protrusion 4 is press-fitted into the large-diameter cylindrical surface 23, the protrusion 4 is elastically deformed obliquely radially inwardly due to abutment between the edge of the open end of the large-diameter cylindrical surface 23 and the tapered surface 4a. Thus, no excessive stress acts on the root portion of the protrusion 4, which prevents breakage of the protrusion 4.

FIG. 2 shows a modified rubber seal 1 which has three seal lips 6 kept in elastic contact with the cylindrical radially outer surface of the inner race 24, and includes the thick-walled fitting portion 3 and the protrusion 4 at its radially outer portion, with the fitting portion 3 press-fitted in the seal groove 22 formed in the outer race 21, and the protrusion 4 kept in elastic contact with the large-diameter cylindrical surface 23 of the outer race 21, thereby rotationally fixing the rubber seal 1 to the outer race.

With this rubber seal 1, since the three seal lips 6 are kept in elastic contact with the cylindrical radially outer surface of the inner race 24, while its sealability is high, it tends to encounter large rotational resistance, so that it tends to rotate together with the inner race 24. Thus, when mounting a conventional rubber seal of this type, as shown in FIG. 4, it is ordinarily fixed to the outer race by caulking the bent portion provided at its radially outer portion. Such fixing steps are extremely time-consuming.

But by providing the rubber seal 1 with the fitting portion 3 and the protrusion 4, the rubber seal 1 can be mounted to the outer race by press-fitting. Thus, the rubber seal can be easily mounted in position.

The metal core 2 for reinforcing the rubber seal 1 has a sheared edge 7 at the outer periphery formed by press stamping. The difference in radius between the outer diameter of the metal core 2 and the inner diameter of the large-diameter cylindrical surface 23 is set to be 0.1 mm or over and 2 mm or less.

With this arrangement, the sheared edge 7 formed on the outer periphery of the metal core 2 reduces radial elastic deformation of the fitting portion 3. Thus, in this case too, the fitting portion 3 can be pressed hard against the inner periphery of the seal groove 22. Moreover, the metal core 2 is less likely to impair radially inward elastic deformation of the protrusion 4, so that the protrusion 4 can be easily press-fitted into the large-diameter cylindrical surface 23. Also, since the cylindrical portion 2a shown in FIG. 1 can be omitted, the metal core 2 can be manufactured easily.

Further, by setting the difference in radius between the outer diameter of the metal core 2 and the inner diameter of the large-diameter cylindrical surface 23 to be 0.1 mm or over, it is possible to prevent the sheared edge on the radially outer surface of the metal core 2 from interfering with the radially inner portion of the large-diameter cylindrical surface 23 of the bearing outer race 21, thus making it easier to fit the fitting portion 3 of the rubber seal in the seal groove 22.

What is claimed is:

1. A rolling bearing and seal fixing arrangement comprising:
   a rolling bearing outer race having a radially inwardly facing small diameter cylindrical surface, a radially inwardly facing large diameter cylindrical surface that is larger in diameter than said small diameter cylindrical surface and is located axially outwardly of said small diameter cylindrical surface, and a radially inwardly facing seal groove located axially between said small diameter cylindrical surface and said large diameter cylindrical surface and being recessed so as to have a diameter that is larger than the diameter of the large diameter cylindrical surface; and
   a rubber seal, having a reinforcing metal core embedded therein, mounted to the rolling bearing outer race;
   wherein the rubber seal includes a fitting portion engaged in a press-fit relationship in the seal groove of the rolling bearing outer race, and a contact portion formed axially outwardly of the fitting portion and engaged in elastic contact with the large diameter cylindrical surface of the rolling bearing outer race;
   wherein the contact portion of the rubber seal is constituted by an annular protrusion protruding radially outwardly, and spaced axially outwardly from the fitting portion of the rubber seal;
   wherein a radially outer portion of the reinforcing metal core is embedded in the fitting portion of the rubber seal and extends radially outwardly beyond the small diameter cylindrical surface of the rolling bearing outer race;
   wherein a side of the protrusion facing the fitting portion is a tapered surface tapered such that the wall thickness of the protrusion deceases radially outwardly;
   wherein the contact portion of the rubber seal has no reinforcing metal core embedded therein;
   wherein a radially inwardly recessed groove is formed axially between the fitting portion of the rubber seal and the annular protrusion that constitutes the contact portion of the rubber seal; and wherein the rubber seal includes at least one lip to be kept in elastic contact with an outer periphery of an inner race.

2. The fixing arrangement of claim 1 wherein the metal core has a press-stamped sheared edge on its outer periphery, and wherein the difference in radius between the outer diameter of the metal core and the inner diameter of the large-diameter cylindrical surface is 0.1 mm or over and 2 mm or less.

3. The fixing arrangement of claim 2 wherein the at least one lip comprises a plurality of lips to be kept in elastic contact with the outer periphery of the inner race.

4. The fixing arrangement of claim 1 wherein the at least one lip comprises a plurality of lips to be kept in elastic contact with the outer periphery of the inner race.

5. The fixing arrangement of claim 4 wherein the reinforcing metal core extends radially inwardly beyond the fitting portion and the annular protrusion that constitutes the contact portion of the rubber seal.

6. The fixing arrangement of claim 1 wherein
the rubber seal has a radially center portion that is elongated radially, and a radially outer portion that is axially thicker than the radially center portion; and
the radially outer portion is constituted by the fitting portion and the contact portion.

7. The fixing arrangement of claim 6 wherein the reinforcing metal core extends through the radially center portion of the rubber seal, and includes a radially elongated outer section that extends into the fitting portion of the rubber seal.

8. The fixing arrangement of claim 6 wherein the reinforcing metal core extends through the radially center portion of the rubber seal, and a radially outermost end of the reinforcing metal core is radially elongated and terminates in the fitting portion of the rubber seal.

9. The fixing arrangement of claim 8 wherein the radially outer portion of the seal protrudes axially outwardly from the radially center portion of the rubber seal.

10. The fixing arrangement of claim 6 wherein the radially outer portion of the seal protrudes axially outwardly from the radially center portion of the rubber seal.

11. The fixing arrangement of claim 1 wherein the reinforcing metal core extends radially inwardly beyond the fitting portion and the annular protrusion that constitutes the contact portion of the rubber seal.

* * * * *